Patented May 11, 1943

2,318,657

UNITED STATES PATENT OFFICE 2,318,657

DEPOSITED LATEX ARTICLE

Robert Oliff Alexander, Pawtucket, R. I., assignor to United States Rubber Company, New York, N. Y., a corporation of New Jersey No Drawing. Application October 30, 1940,
Serial No. 363,545

8 Claims. (Cl. 117—139)

This invention relates to a method of increasing the tensile strength of vulcanized, deposited latex articles.

Deposited latex articles are commonly made by dipping, spreading, spraying, or extrusion methods in which rubber particles of the latex are directly deposited by drying or chemical coagulation to form rubber articles of the desired shape, as for example, in the manufacture of gloves, caps, shoes, thread, sheeting, and the like.

The present invention relates to increasing the tensile strength of such vulcanized, deposited latex articles by a simple treatment of the same. The treatment according to the present invention by which the tensile strength of the articles is increased also increases the transparency of the rubber.

According to the present invention deposited latex articles are soaked for at least a half hour in a bath comprising an aliphatic mono or dihydric alcohol, to which may be added if desired an acidic or an alkaline material. Preferably, the articles are soaked for several hours but very appreciable improvements may be obtained in a shorter period of time. For economic reasons, the present preferred bath comprises denatured ethyl alcohol and a relatively small amount of acetic acid, normally less than 1 part of acetic acid to 10 parts of alcohol.

The present improvement in the tensile strength of the vulcanized deposited latex articles is obtained in the case of articles deposited from unvulcanized or prevulcanized latex of any formulation, and regardless of the method of forming the finished article or the degree of vulcanization of the same.

In order to illustrate various treatments of a latex article, the following examples are included:

A conventional latex compound of the following formula was prepared.

Centrifuged latex (60% solids)
    parts dry weight__ 100
30% aqueous KOH solution_____do____ .6
35% aqueous formaldehyde solution
    parts wet weight__ 3.5
Colloidal sulphur (as 64.5% aqueous
  paste)_____parts dry weight__ 1.7
Zinc oxide (as 55% aqueous paste) __do____ .7
Accelerator _____do____ 1.3
Antioxidant _____do____ .3
Nekal BX (stabilizer) (as 20%
  aqueous solution)_____do____ .5
Glue (as 10% aqueous solution)_____do____ .5
Water to make 55% solids.

Glove forms were dipped into this compound in an in-and-out dip followed by an in-and-out dip of the latex coated forms in a mixture of 50-50 glacial acetic acid and denatured alcohol to which 2 parts magnesium oxide had been added per 100 parts solution. After drying for a short period of time in warm air, the forms were again dipped into the above latex compound and allowed to remain in the latex until the desired thickness of coagulum had been built up, after which the forms were removed, dipped in a solution of 50-50 glacial acetic acid and denatured alcohol, and then dried in air at 160° F. for one hour and finally vulcanized in air at 260° F. for another hour. The gloves were then stripped from the forms, washed in hot water, and dried in a tumbling barrel. Samples of gloves thus made were soaked for different times in various solutions according to the present invention, removed, and dried by tumbling in hot air at 180° F. Standard test strips were cut out of treated and untreated samples and tested for tensile strength and elongation at break according to standard A. S. T. M. methods. A tabulation of tensile strength and elongation determinations on untreated samples and samples treated in various manners according to the present invention, will be found in the table below.

| Composition of treating bath | Time of soaking | Tensile strength | Elongation |
|---|---|---|---|
|  | Hours | Lbs./sq. in. | Per cent |
| Untreated _____ |  | 3220 | 817 |
| Ethyl butanol_____ | ½ | 4300 | 825 |
| Do._____ | 3 | 4640 | 850 |
| Diethylene glycol_____ | 1 | 4050 | 837 |
| 1 part amyl alcohol_____<br>1 part acetic acid_____<br>30 parts denatured ethyl alcohol_____ | 3½ | 4850 | 875 |
| 1 part potassium hydroxide___<br>30 parts denatured ethyl alcohol_____ | 3½ | 4430 | 850 |
| 1 part glacial acetic acid_____ | 15½ | 4440 | 830 |

The tensile strength and elongation determinations above are so-called "green" tensiles and elongations, that is, tests on the finished articles as made, before and after the treatment according to the present invention. Similar tensile strength and elongation determinations were also made on artificially aged and otherwise treated samples. For example, samples of untreated finished gloves and of gloves treated for 15½ hours in a bath of 30 parts denatured alcohol and 1 part glacial acetic acid, as shown in the last line of the table above, were tested for tensile strength and elongation after ten sterilizations of the gloves in steam (to simulate ordinary treatment of surgeons' gloves), and after 1 week in the Geer oven, and after 96 hours in the oxygen bomb. In all these cases, the gloves treated according to the present invention had a decidedly increased tensile strength and stood up very much better than the untreated gloves. The improvement may be seen from the following table of data:

| | Untreated | Treated |
|---|---|---|
| Green: | | |
| Tensile strength | 3220 | 4438 |
| Elongation per cent | 817 | 829 |
| 10 steam sterilizations: | | |
| Tensile strength | 3289 | 4505 |
| Elongation per cent | 856 | 925 |
| 1 week—Geer oven: | | |
| Tensile strength | 1931 | 4902 |
| Elongation per cent | 587 | 837 |
| 96 hrs. O₂: | | |
| Tensile strength | Ruined | 4403 |
| Elongation Per cent | Ruined | 850 |

The above tests were made on so-called fully vulcanized or cured gloves that had been vulcanized to the degree necessary for the intended use. The T-50 value of the gloves was 0° C., showing a relatively high degree of vulcanization. (For explanation of the T-50 test, reference is made to the article "The T-50 test for state of vulcanization," by Gibbons, Gerke and Tingey, 1933 Ind. Eng. Chem., Anal. Ed. vol 5, p. 279.) It is deemed sufficient here to explain that the T-50 value of completely unvulcanized rubber is about +18° C., and the lower the T-50 value the higher the degree of vulcanization. The treatment of the present invention does not appear to increase the tensile strength of completely unvulcanized rubber. It does, however, increase the tensile strength of only slightly vulcanized rubber as well as more highly vulcanized films. For example, tests were run on gloves produced as above but without the final heating for an hour at 260° F. to complete the vulcanization. The T-50 value of test pieces cut from these gloves was T-8.0° C., showing only a slight cure. Tensile strength determinations gave 3125 pounds per square inch and elongation at break of 875%. Treatment of these samples in a mixture of 30 parts of denatured alcohol and 1 part of glacial acetic acid for 24 hours increased the tensile strength to 4615 pounds per square inch and the elongation to 958%.

Latex thread formed by extruding latex into a coagulant bath, removing, drying and vulcanizing gave a tensile strength of 5200 lbs. per square inch and an elongation at break of 630%. Treatment of the same thread in a mixture of 30 parts of denatured alcohol and 2 parts of glacial acetic acid for 16 hours increased the tensile strength to 6060 lbs. per sq. in. and the elongation at break to 690%.

It may thus be seen that the soaking of vulcanized, deposited latex articles in a bath of an aliphatic mono or dihydric alcohol, with or without the addition of an acid or alkali, greatly increases the tensile strength and aging properties of such articles.

In view of the many changes and modifications that may be made without departing from the principles underlying the invention, reference should be made to the appended claims for an understanding of the scope of the invention.

Having thus described my invention what I claim and desire to protect by Letters Patent is:

1. The method of increasing the tensile strength of a vulcanized, deposited latex article which comprises soaking a vulcanized, deposited latex article for at least a half hour in a liquid bath consisting of an alcohol from the group consisting of mono- and di-hydric alcohols having not more than six carbon atoms, removing said article, and drying the same.

2. The method of increasing the tensile strength of a vulcanized, deposited latex article which comprises soaking a vulcanized, deposited latex article for at least a half hour in a liquid bath comprising a major proportion of an alcohol from the group consisting of mono- and di-hydric alcohols having not more than six carbon atoms and a minor proportion of acetic acid, removing said article, and drying the same.

3. The method of increasing the tensile strength of a vulcanized, deposited latex article which comprises soaking a vulcanized, deposited latex article for at least a half hour in a liquid bath comprising a major proportion of an alcohol from the group consisting of mono- and di-hydric alcohols having not more than six carbon atoms and a minor proportion of an alkali, removing said article, and drying the same.

4. The method of increasing the tensile strength of a vulcanized, deposited latex article which comprises soaking a vulcanized, deposited latex article for at least a half hour in a liquid bath consisting of aliphatic monohydric alcohol having not more than six carbon atoms, removing said article, and drying the same.

5. The method of increasing the tensile strength of a vulcanized, deposited latex article which comprises soaking a vulcanized, deposited latex article for at least a half hour in a liquid bath comprising a major proportion of an aliphatic monohydric alcohol having not more than six carbon atoms and a minor proportion of acetic acid, removing said article, and drying the same.

6. The method of increasing the tensile strength of a vulcanized, deposited latex article which comprises soaking a vulcanized, deposited latex article for at least a half hour in a liquid bath comprising a major proportion of an aliphatic monohydric alcohol having not more than six carbon atoms and a minor proportion of an alkali, removing said article, and drying the same.

7. The method of increasing the tensile strength of a vulcanized, deposited latex article which comprises soaking a vulcanized, deposited latex article for at least a half hour in a liquid bath comprising a major proportion of denatured ethyl alcohol and a minor proportion of an alkali, removing said article, and drying the same.

8. The method of increasing the tensile strength of a vulcanized, deposited latex article which comprises soaking a vulcanized, deposited latex article for at least a half hour in a liquid bath comprising a major proportion of denatured ethyl alcohol and a minor proportion of acetic acid, removing said article, and drying the same.

ROBERT OLIFF ALEXANDER.